G. R. McQUEEN.
AUTOMATIC TRAIN STOPPING APPARATUS.
APPLICATION FILED APR. 29, 1914.
1,133,987.
Patented Mar. 30, 1915.
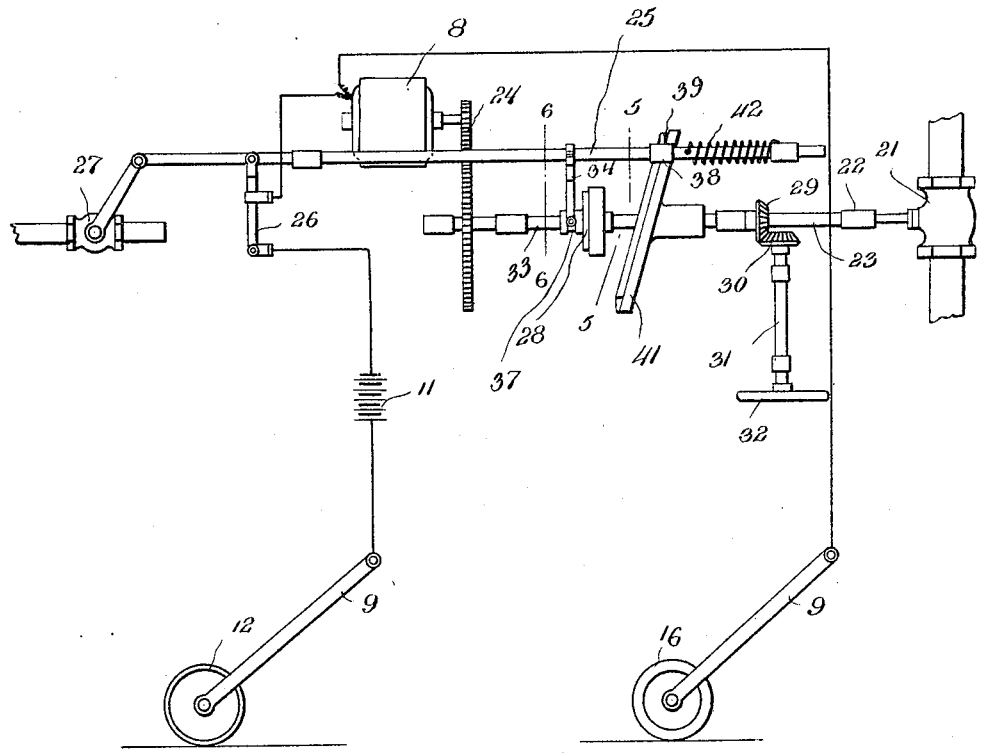
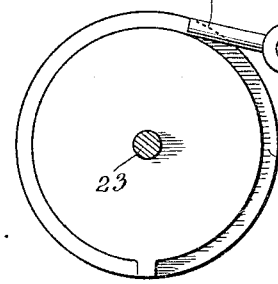
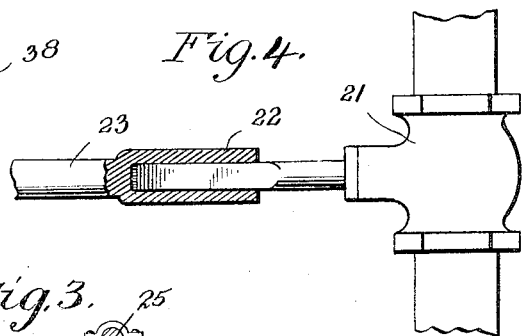
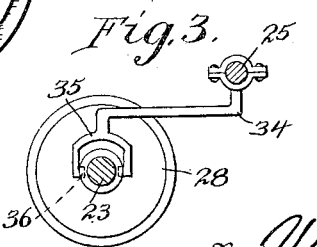
Inventor
G. R. McQueen.
Witnesses
W. R. Smith
John J. McCarthy
By Victor J. Evans
Attorney

UNITED STATES PATENT OFFICE.

GLENN R. McQUEEN, OF BALDWIN CITY, KANSAS.

AUTOMATIC TRAIN-STOPPING APPARATUS.

1,133,987.  Specification of Letters Patent.  Patented Mar. 30, 1915.

Application filed April 29, 1914. Serial No. 835,245.

*To all whom it may concern:*

Be it known that I, GLENN R. McQUEEN, a citizen of the United States of America, residing at Baldwin City, in the county of Douglas and State of Kansas, have invented new and useful Improvements in Automatic Train-Stopping Apparatus, of which the following is a specification.

This invention relates to improvements in automatic train stopping apparatus and has particular application to electrically controlled apparatus of this class.

In carrying out the present invention, it is my purpose to provide automatic train stopping apparatus whereby in the event of two trains or cars approaching each other upon the same trackway the propelling power will be cut off and the brakes applied to bring such trains or cars to a standstill.

It is also my purpose to provide an apparatus of the type set forth which may be installed and maintained at a minimum expense, which will operate efficiently and effectively for its intended purpose and which will embody comparatively few parts and these so correlated and arranged as to reduce the possibility of derangement to a minimum.

With the above and other objects in view, the invention consists in the construction, combination and arrangement of parts hereinafter set forth in and falling within the scope of the claims.

In the accompanying drawings, Figure 1 is a diagrammatic view of the car carried mechanism. Fig. 2 is a sectional view on the line 5—5 of Fig. 1. Fig. 3 is a similar view on the line 6—6 of Fig. 1. Fig. 4 is a fragmentary plan view showing a detail of the invention, parts being shown in section.

In the embodiment of my invention selected for illustrative purposes, the car carried mechanism comprises an electric motor 8 having the terminals thereof connected with supporting arms 9, 9 each pivoted at one end as at 10 with the frame of the motor car. A suitable source of electrical energy as a battery 11 is connected in the conductor leading from one terminal of the motor to the adjacent arm 9. Journaled in the lower end of one arm 9 is a trolley wheel 12, while extending upwardly from the wheel end of the arm is a rod 13 slidably mounted within a bearing 14 carried by the frame of the car and encircling the rod between the bearing 14 and the wheel end of the arm is a coiled expansion spring 15 having one end in engagement with the bearing 14 and the opposite end abutting the arm and acting to hold the trolley wheel 12 normally in engagement with an electric current conductor. A trolley wheel 16 is journaled in the lower end of the other arm 9 and is adapted to ride upon a second conductor coöperating with the conductor engaged by the wheel 12. The wheel end of the last-mentioned arm 9 is equipped with an upstanding rod 17 slidably mounted within a bearing 18 and threaded into the bearing 18 coaxial with the rod 17 is a stem 19 having the bearing end thereof suitably connected with the upper end of the rod 17 and the opposite extremity equipped with a hand wheel 20 whereby the pressure of the wheel 16 on the sectional conductors may be varied.

In practice, the trolley wheels 12 and 16 on each motor car ride over suitable conductors and when two trains approaching each other upon the same track enter the same block the batteries thereon are connected in series and current flows through the established circuit to energize the motors 8 on the trains.

Located in the steam main of the locomotive is a globe valve 21 having the stem thereof disposed within an elongated socket 22 carried upon one end of a shaft 23 journaled in suitable alining bearings and capable of rotary movement therein. Alining axially with the shaft 23 and journaled in horizontally alining bearings is a shaft 33 connected up with the armature shaft of the motor 8 through the medium of a system of gearing 24 so that upon the rotation of the motor shaft motion will be imparted to the shaft 33. Splined upon the inner end of the shaft 33 is the male member of a clutch 28, while fixed to the adjacent end of the shaft 23 is the female member of such clutch normally engaged by the male member thereof whereby in the rotation of the shaft 33 motion is transmitted to the shaft 23 to close the valve 21, the stem of such valve sliding within the socket 22 in the movement of the valve to closed position. Lying parallel with the axially alining shafts 23 and 33 is a rod 25 slidably mounted within bearings and capable of longitudinal movement. This rod 25 is suitably connected with a switch 26 located in one of the motor leads and with a valve 27 located in the train line air pipe or brake pipe of the air brake system of a train. Fast to the rod 25 and projecting laterally therefrom is a shipper arm 34 having the outer end thereof formed with a yoke 35 surrounding the hub of the male member of the clutch 28 and having the inner faces of the opposite limbs thereof formed with inwardly extending pins 36 disposed within a groove 37 formed in the hub of such clutch member. Fast upon the rod 25 is a collar 38 provided with an outwardly extending pin 39 disposed within a cam groove 40 formed in a disk 41 fast upon the shaft 23. Surrounding the rod 25 and holding the latter normally against longitudinal sliding movement is a coiled contractile spring 42 having one end fastened to the rod and the opposite end secured to the adjacent bearing. As the shaft 23 is rotated to close the valve 21, motion is imparted to the disk 41 and in the rotation of the latter the wall of the cam groove 40 acts upon the pin 39 and slides the rod 25 longitudinally within its bearings against the action of the spring 42 so that, as soon as the valve 21 is closed, the switch 26 and the valve 27 are opened and the male member of the clutch 28 disengaged from the female member thereof thereby disconnecting the shaft 33 from the shaft 23 so that further movement of the last-mentioned shaft is prevented. Keyed upon the shaft 23 is a bevel pinion 29 meshing with a bevel gear 30 fixed upon one end of a shaft 31, the opposite end of the latter being equipped with a hand wheel 32 by means of which the shaft 31 may be rotated to revolve the shaft 23. In the rotation of the shaft 23 under the action of the hand wheel 32, the valve 21 is restored to normal open position and the disk 41 actuated to release the pin 39 whereby the spring 42 reacts and slides the rod 25, thus restoring the valve 27, switch 26 and clutch 28 to normal position.

I claim:

1. In automatic train stopping apparatus, car carried mechanism comprising a motor, an electric circuit for said motor, means for closing said circuit, a shaft, means operable from said shaft for cutting off the propelling power of the car, a second shaft, driving connections between said second shaft and motor, a clutch normally coupling said second shaft to said first shaft, a rod capable of longitudinal movement, means operable from said rod for disengaging the members of said clutch, and means operable from said first shaft for sliding said rod to disengage the clutch members succeeding the cutting off of the propelling power of the car.

2. In automatic train stopping apparatus, car carried mechanism comprising a motor, an electric circuit for said motor, means for closing said circuit, a shaft, means operable from said shaft for cutting off the propelling power of the car, a second shaft, driving connections between said second shaft and motor, a clutch normally coupling said second shaft to said first shaft, a rod capable of longitudinal movement, means operable from said rod for disengaging the members of said clutch, a pin projecting outwardly from said rod, and a disk fast to said first shaft and formed with a cam groove receiving said pin and acting to slide said rod to disengage the members of said clutch succeeding the cutting off of the propelling power of the car.

3. In automatic train stopping apparatus, car carried mechanism comprising a motor, an electric circuit for said motor, means for closing said circuit, a shaft, means operable from said shaft for cutting off the propelling power of the car, a second shaft, driving connections between said second shaft and motor, a clutch normally coupling said second shaft to said first shaft, a rod capable of longitudinal movement, means operable from said rod for disengaging the members of said clutch, means operable from said first shaft for sliding said rod to disengage the clutch members succeeding the cutting off of the propelling power of the car, a switch connected in said motor circuit, and a connection between said switch and rod whereby the switch will be opened immediately succeeding the operation of said first shaft.

4. In automatic train stopping apparatus, car carried mechanism comprising a motor, an electric circuit for said motor, means for closing said circuit, a shaft, means operable from said shaft for cutting off the propelling power of the car, a second shaft, driving connections between said second shaft and motor, a clutch normally coupling said second shaft to said first shaft, a rod capable of longitudinal movement, means operable from said rod for disengaging the members of said clutch, means operable from said first shaft for sliding said rod to disengage the clutch members succeeding the cutting off of the propelling power of the car, a switch connected in said motor circuit, a connection between said switch and rod whereby the switch will be opened immediately succeeding the operation of said first shaft, a valve located in the train line air pipe, and a connection between said rod and valve whereby the latter will be opened in the sliding of the rod.

5. In automatic train stopping apparatus, car carried mechanism comprising a motor, an electric circuit for said motor, means for closing said circuit, a shaft, means operable from said shaft for cutting off the propelling power of the car, a second shaft, driving connections between said second shaft and motor, a clutch normally coupling said second shaft to said first shaft, a rod capable of longitudinal movement, means operable from said rod for disengaging the members of said clutch, means operable from said first shaft for sliding said rod to disengage the clutch members succeeding the cutting off of the propelling power of the car, and manually operable means for rotating said first shaft to restore the latter to normal position and relieve the rod of the influence of said first shaft.

6. In automatic train stopping apparatus, car carried mechanism comprising a motor, an electric circuit for said motor, means for closing said circuit, a shaft, means operable from said shaft for cutting off the propelling power of the car, a second shaft, driving connections between said second shaft and motor, a clutch normally coupling said second shaft to said first shaft, a rod capable of longitudinal movement, means operable from said rod for disengaging the members of said clutch, means operable from said first shaft for sliding said rod to disengage the clutch members succeeding the cutting off of the propelling power of the car, manually operable means for rotating said first shaft to restore the latter to normal position and relieve the rod of the influence of said first shaft, and means for restoring said rod to normal position succeeding the manual operation of said first shaft.

7. In automatic train stopping apparatus, car carried mechanism comprising a motor, an electric circuit for said motor, means for closing said circuit, a shaft, means operable from said shaft for cutting off the propelling power of the car, a second shaft, driving connections between said second shaft and motor, a clutch normally coupling said second shaft to said first shaft, a rod capable of longitudinal movement, means operable from said rod for disengaging the members of said clutch, means operable from said first shaft for sliding said rod to disengage the clutch members succeeding the cutting off of the propelling power of the car, manually operable means for rotating said first shaft to restore the latter to normal position and relieve the rod of the influence of said first shaft, and a spring for restoring said rod to normal position succeeding the manual operation of said first shaft.

8. In automatic train stopping apparatus, car carried mechanism comprising a motor, an electric circuit for said motor, means for closing said circuit, a shaft, means operable from said shaft for cutting off the propelling power of the car, a second shaft, driving connections between said second shaft and motor, a clutch normally coupling said second shaft to said first shaft, a rod capable of longitudinal movement, means operable from said rod for disengaging the members of said clutch, a pin on said rod, and a cam disk on said first shaft engaging said pin and operable in the operation of the first shaft to slide said rod to disengage the clutch members succeeding the cutting off of the propelling power of the car.

In testimony whereof I affix my signature in presence of two witnesses.

GLENN R. McQUEEN.

Witnesses:
   Geo. D. McCleery,
   J. B. Wilson.

Copies of this patent may be obtained for five cents each, by addressing the "Commissioner of Patents, Washington, D. C."